US008967695B2

(12) United States Patent
Brinas

(10) Patent No.: US 8,967,695 B2
(45) Date of Patent: Mar. 3, 2015

(54) ADAPTABLE BIN WITH COLLAPSIBLE SECONDARY BIN

(71) Applicant: GM Global Technology Operations LLC, Detroit, MI (US)

(72) Inventor: Gerard Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 14 days.

(21) Appl. No.: 13/803,040

(22) Filed: Mar. 14, 2013

(65) Prior Publication Data

US 2014/0265409 A1 Sep. 18, 2014

(51) Int. Cl.
*B60R 7/04* (2006.01)
(52) U.S. Cl.
CPC ........................................ *B60R 7/04* (2013.01)
USPC ........................................ 296/37.8; 296/24.34
(58) Field of Classification Search
CPC ............ B60R 7/00; B60R 7/04; B60R 13/00; B60N 3/00
USPC ............ 296/24.34, 24.44, 24.46, 37.8, 37.14, 296/37.15, 1.09
See application file for complete search history.

(56) References Cited

U.S. PATENT DOCUMENTS

| 4,600,255 | A  | * | 7/1986  | Dubarko ........................ 312/333 |
| 6,203,088 | B1 | * | 3/2001  | Fernandez et al. ........... 296/37.8 |
| 6,851,736 | B1 | * | 2/2005  | Klopp et al. .................. 296/37.8 |
| 7,434,859 | B2 | * | 10/2008 | Mulvihill .................... 296/24.34 |
| 7,581,774 | B2 | * | 9/2009  | Abro et al. .................... 296/37.8 |
| 7,784,843 | B2 | * | 8/2010  | Lota et al. ................... 296/24.34 |
| 2005/0189776 | A1 | * | 9/2005  | Sturt ........................... 296/24.34 |
| 2011/0215605 | A1 | * | 9/2011  | Spitler et al. ............... 296/24.34 |

* cited by examiner

*Primary Examiner* — Jason S Morrow
*Assistant Examiner* — E Turner Hicks
(74) *Attorney, Agent, or Firm* — Quinn Law Group, PLLC

(57) ABSTRACT

An adaptable bin is provided. The adaptable bin includes a bin floor and at least two bin sidewalls. The bin floor and the bin sidewalls define a storage volume. A bin opening is defined by the bin sidewalls, and allows access to the storage volume. The adaptable bin also includes a secondary bin having at least a first tray and a second tray. The first is tray operatively attached to one of the bin sidewalls. The second tray is slidably attached to the first tray, and is slidable between a collapsed position proximal to the first tray and an expanded position distal to the first tray. The secondary bin protrudes into more of the storage volume when the second tray is in the expanded position than in the collapsed position.

11 Claims, 5 Drawing Sheets

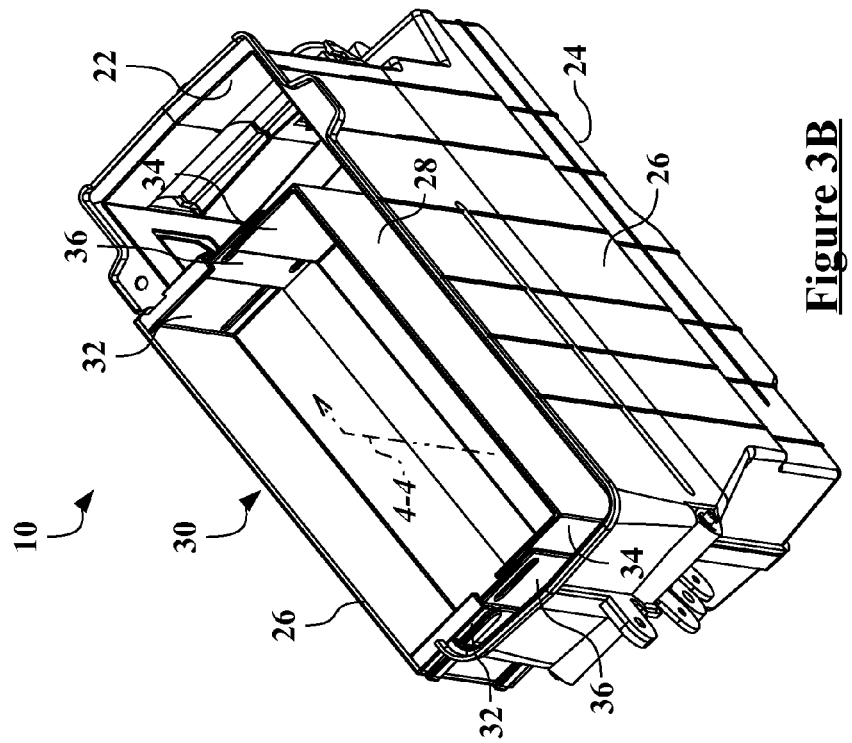
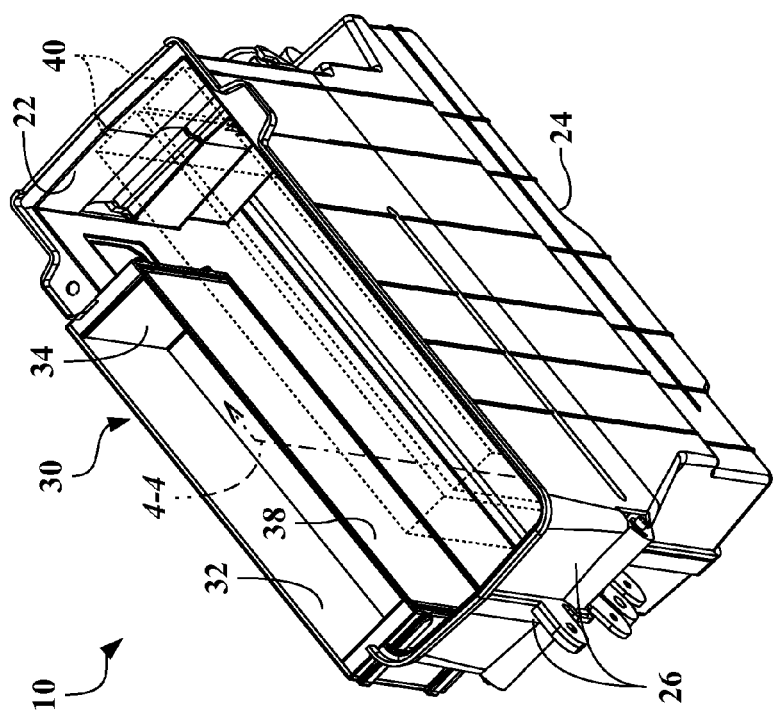

ADAPTABLE BIN WITH COLLAPSIBLE SECONDARY BIN

TECHNICAL FIELD

This disclosure relates to storage bins, particularly those used in vehicles.

BACKGROUND

Storage bins may be used to hold various items in the vehicle, including electronics, vehicle accessories, or personal items. Some vehicles may include one or more storage bins between, or adjacent to, passenger seats. Occupants within the vehicle use the storage bins to store or secure various objects.

SUMMARY

An adaptable bin, such as those used in vehicles, is provided. The adaptable bin includes a bin floor and at least two bin sidewalls. The bin floor and the bin sidewalls define a storage volume. A bin opening is defined by the bin sidewalls. The bin opening allows access to the storage volume.

The adaptable bin also includes a secondary bin, which has at least a first tray and a second tray. The first is tray operatively attached to one of the bin sidewalls. The second tray is slidably attached to the first tray, and is slidable between a collapsed position proximal to the first tray and an expanded position distal to the first tray. The secondary bin protrudes into more of the storage volume when the second tray is in the expanded position than it does when the second tray is in the collapsed position.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 3A is a schematic isometric view of the adaptable bin, shown with the secondary bin in a collapsed position;

FIG. 3B is a schematic isometric view of the adaptable bin, shown with the secondary bin in an expanded position;

DETAILED DESCRIPTION

Figure 1:
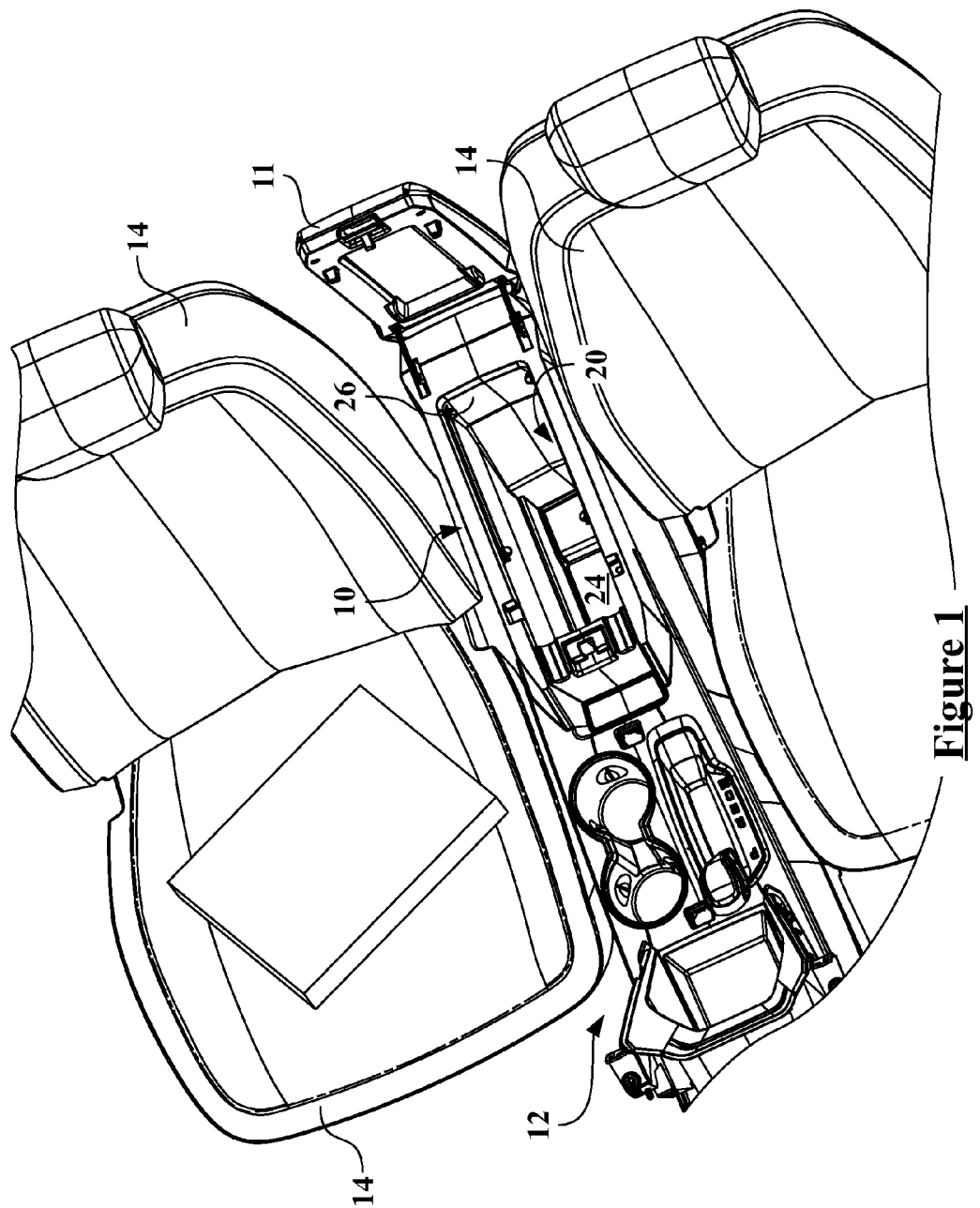
FIG. 1 is a schematic isometric top view of an adaptable bin disposed within a console between two passenger seats.

Referring to the drawings, like reference numbers correspond to like or similar components wherever possible throughout the several figures. FIG. 1 shows an adaptable bin 10 for a vehicle (not shown), which may be used for storage of numerous objects or components. The adaptable bin 10 may be located in the passenger compartment or elsewhere within the vehicle. A lid 11 selectively closes and substantially prevents access to the adaptable bin 10.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

The adaptable bin 10 is disposed within a console 12, which is generally located between passenger seats 14. However, the adaptable bin 10 may be located elsewhere, such as the interior side of a door, beneath a removeable rear seat cushion, on the dashboard, or within the trunk or boot.

Figure 2:
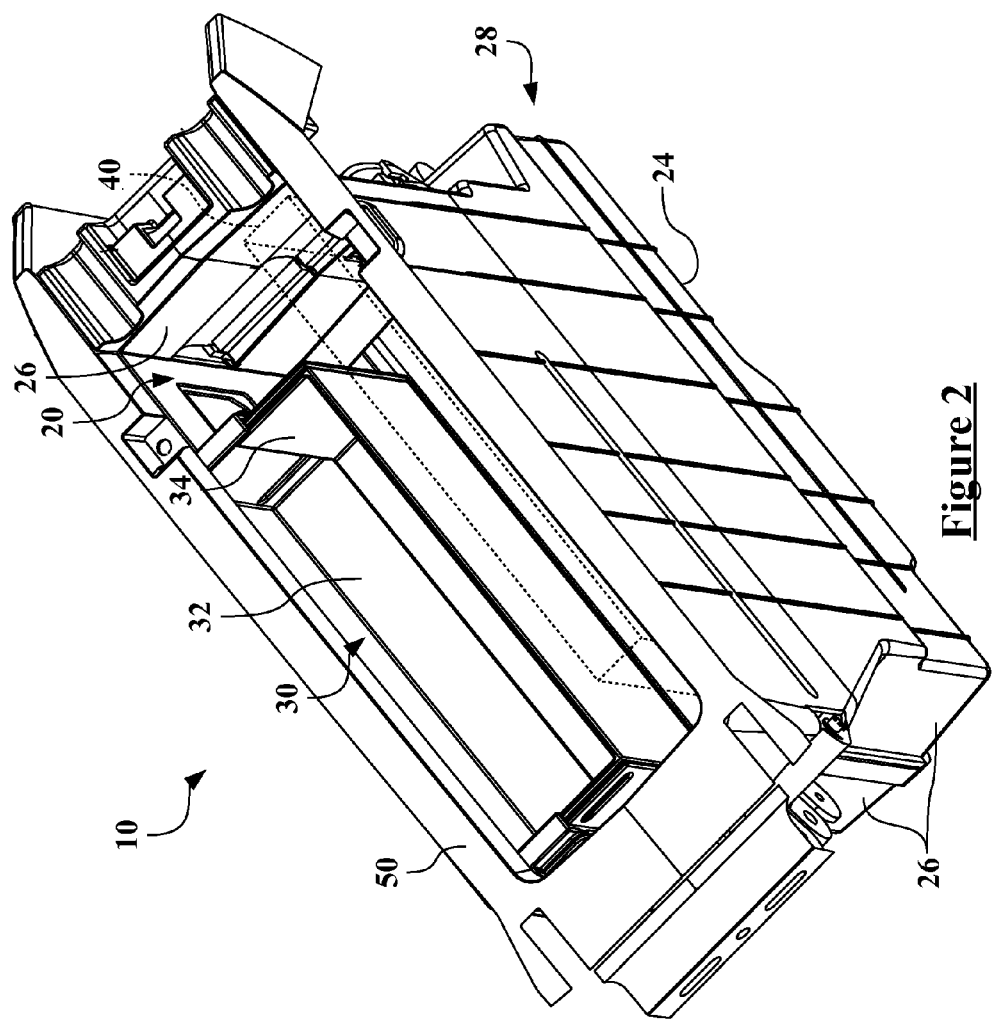
FIG. 2 is a schematic isometric view of the adaptable bin, shown with a secondary bin in an intermediate position.

Referring also to FIG. 2, in addition to FIG. 1, there is shown another view of the adaptable bin 10. FIG. 2 shows the adaptable bin 10 without surrounding components of the vehicle.

The adaptable bin 10 defines a storage volume 20 accessible through a bin opening 22, which is at the top of the adaptable bin 10, relative to the likely orientation of the adaptable bin 10 within the vehicle. However, it should be understood that other orientations of the adaptable bin 10 are possible, and that angling the adaptable bin 10 slightly will have little measurable effect on its performance.

The adaptable bin 10 shown is formed from a bin floor 24 and at least two bin sidewalls 26. The bin opening 22 is defined by the bin sidewalls 26, and allows access to the storage volume 20. The bin floor 24 and the bin sidewalls 26 define the storage volume 20. Additionally, many configurations of the adaptable bin 10 will include the lid 11 or another closure that selectively closes the storage volume 20 by blocking access to the bin opening 22.

In the configuration shown, two bin halves 28, which may be injection-molded pieces, cooperate to form the bin sidewalls 26 and the bin floor 24. Each of the bin halves 28 form side wall portions, end wall portions, and floor portions. However, note that other configurations of the adaptable bin 10 may not include similarly-defined end wall portions, such that much of the ends may be rounded. Furthermore, separate components may be used to form the side wall portions, end wall portions, and floor portions of the adaptable bin 10.

The adaptable bin 10 includes a secondary bin 30, which selectively varies the configuration of storage space and shape within the storage volume 20. The secondary bin 30 is formed from at least an inner tray 32 and an outer tray 34.

The inner tray 32 may be a first tray and is operatively attached to one of the bin sidewalls 26. The outer tray 34 may be a second tray and is selectively movable. The outer tray 34 and the inner tray 32 cooperate to carve a secondary storage volume from the storage volume 20. The secondary bin 30 offsets the volume available in a primary bin, which occupies the remainder of the storage volume 20 not occupied by the secondary bin 30. In configurations having only the inner tray 32 and the outer tray 34, FIG. 2 shows the full extent of the secondary storage volume.

Figure 4B:
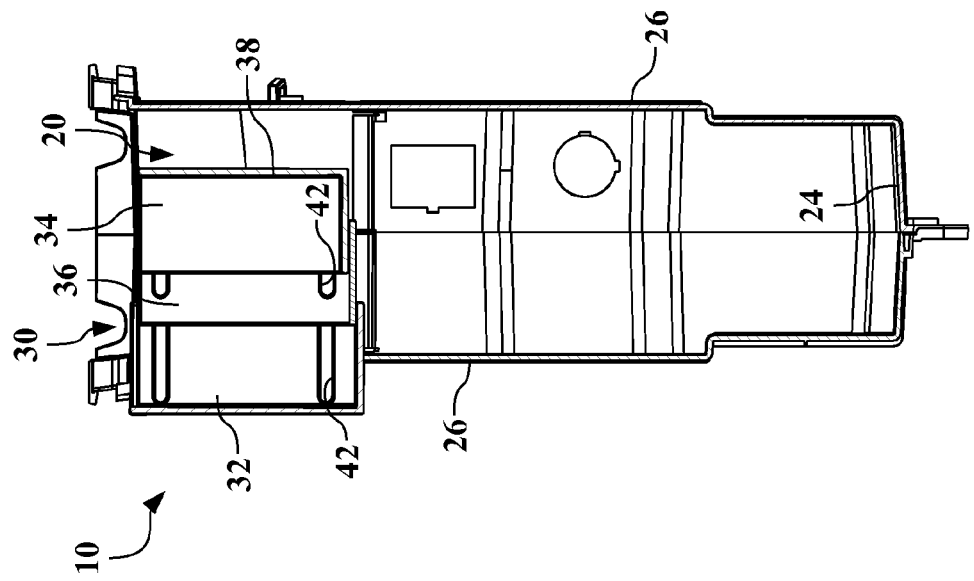
FIG. 4B is a schematic cross-sectional view taken along a section line 4-4 of FIG. 3B.
Figure 4A:
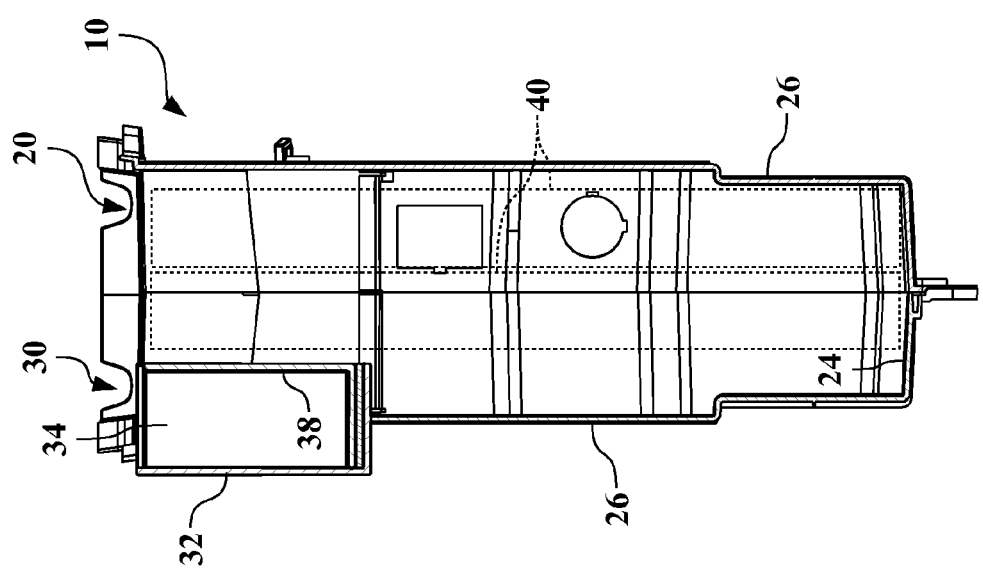
FIG. 4A is a schematic cross-sectional view taken along a section line 4-4 of FIG. 3A.

Referring also to FIGS. 3A and 3B and to FIGS. 4A and 4B, in addition to FIGS. 1-2, there are shown additional illustrative views of portions of the adaptable bin 10. FIG. 3A shows the secondary bin 30 in a fully collapsed position and FIG. 3B shows the secondary bin 30 in a fully expanded position. FIG. 4A is a cross section taken from section line 4-4 of FIG. 3A, and FIG. 4B is a cross section taken from section line 4-4 of FIG. 3B.

In addition to the inner tray 32 and the outer tray 34, the secondary bin 30 may also include an intermediate tray 36, which may be a third tray. The intermediate tray 36 is disposed between the inner tray 32 and the outer tray 34. Note that the inner tray 32, the intermediate tray 36, and the outer tray 34, may be numbered as first through third in any order, and there may be additional trays between the inner tray 32 and the outer tray 34.

The outer tray 34 is slidably attached to the intermediate tray 36, and the intermediate tray 36 is slidably attached to the inner tray 32. The outer tray 34 is slidable between a collapsed position proximal to the intermediate tray 36 and an expanded position distal to, but overlapping a portion of, the intermediate tray 36. The intermediate tray 36 is slidable between a collapsed position proximal to the inner tray 32, and also to the bin sidewall 26, and an expanded position distal to, but overlapping a portion of, the inner tray 32.

The outer tray 34 and the intermediate tray 36 slide substantially parallel to the bin opening 22. In some configurations of the secondary bin 30, there may not be overlap between the outer tray 34 and the intermediate tray 36 or between the intermediate tray 36 and the inner tray 32. The secondary bin 30 protrudes into, or intersects, more of the storage volume 20 when the outer tray 34 is in the expanded position than in the collapsed position.

In the adaptable bin 10 shown, the secondary bin 30 includes a secondary sidewall 38 formed on the outer tray 34. The intermediate tray 36, the outer tray 34, the inner tray 32, and the secondary sidewall 38 define a collapsed secondary volume when the intermediate tray 36 and the outer tray 34 are in the collapsed positions, as shown in FIG. 3A and FIG. 4A. This may be referred to as the fully collapsed state of the secondary bin 30.

Furthermore, the intermediate tray 36, the outer tray 34, the inner tray 32, and the secondary sidewall 38 define an expanded secondary volume when the intermediate tray 36 and the outer tray 34 are in the expanded positions, as shown in FIG. 3B and FIG. 4B. This may be referred to as the fully expanded state of the secondary bin 30.

As illustrated in FIG. 3A and FIG. 4A, when in the secondary bin 30 is fully collapsed, one or more laptops 40 may be stored in the primary bin. However, when in the secondary bin 30 is fully expanded the vertical space of the primary bin is limited. However, slimmer objects, such as books, tablet computers, e-readers, or netbooks, may still be stored in the primary bin.

As shown in FIG. 2, the intermediate tray 36, the outer tray 34, the inner tray 32, and the secondary sidewall 38 may also define an intermediate secondary volume. The intermediate secondary volume is smaller than the expanded secondary volume and larger than the collapsed secondary volume. Contrary to the fully expanded and fully collapsed states of FIGS. 3A-4B, the secondary bin 30 is in an intermediate when one of the intermediate tray 36 and the outer tray 34 is in the collapsed position but the other is in the expanded position. As illustrated in FIG. 2, the intermediate state of the secondary bin 30 may allow, for example, one laptop 40 to be stored with the primary bin.

Figure 5:
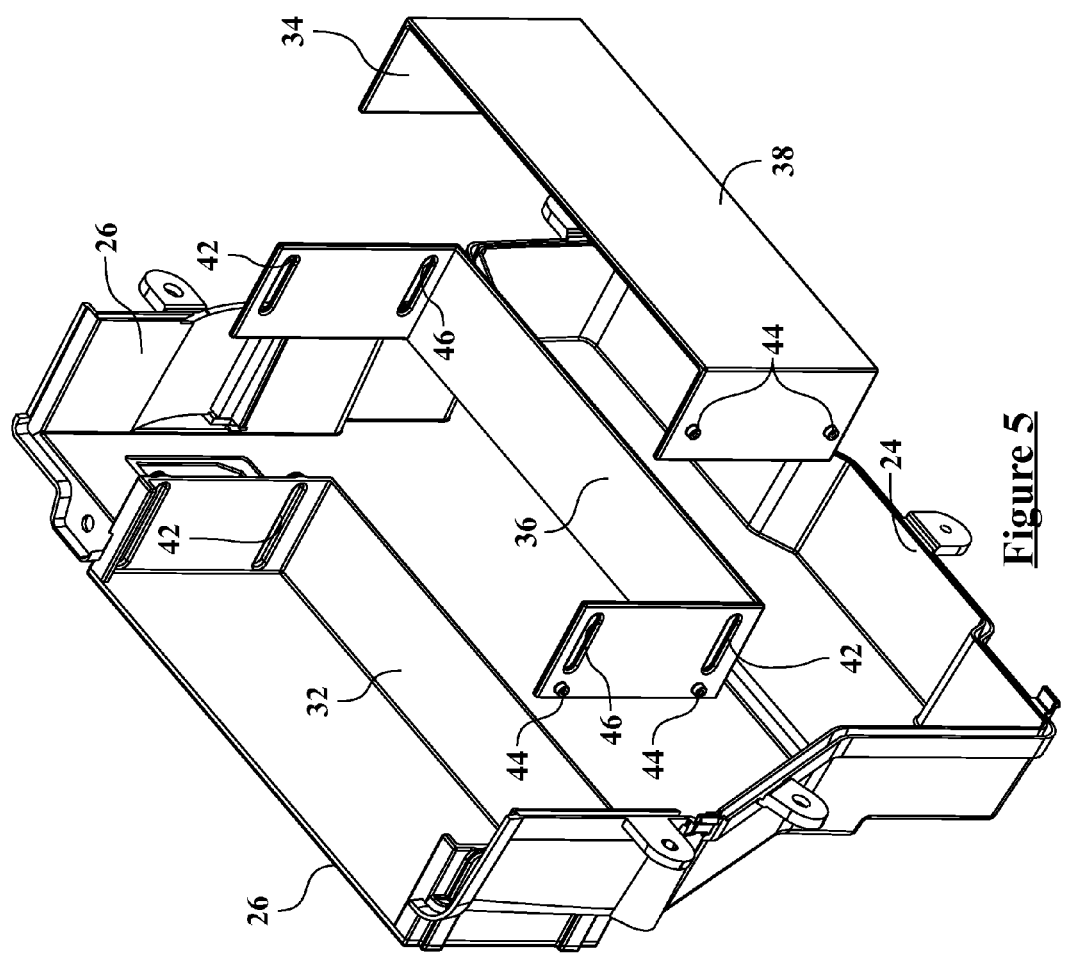
FIG. 5 is a schematic exploded isometric view of a portion of the adaptable bin.

Referring now to FIG. 5, and with continued reference to FIGS. 1-4B, there is shown an exploded view of a portion of the adaptable bin 10. FIG. 5 shows the secondary bin 30 with the inner tray 32, the intermediate tray 36, and the outer tray 34 exploded. All of the components of the secondary bin 30 may be formed from plastic or other suitable materials.

The inner tray 32 is shown attached to the bin sidewall 26. All, or portions, of the inner tray 32 may be formed integrally, as one piece, with the bin sidewall 26. Alternatively, the inner tray 32 may be formed separately and then attached to the bin sidewall 26.

As shown in FIG. 5, the secondary bin 30 may have features to guide movement between the collapsed and expanded states and to assist in keeping the secondary bin 30 in the expanded state or the collapsed state. One or more horizontal slots 42 may be formed in the inner tray 32 and the intermediate tray 36. Similarly, one or more pins 44 may be formed on the outer tray 34 and the intermediate tray 36. The pins 44 cooperate with the horizontal slots 42 to guide and limit movement of the outer tray 34 relative to the intermediate tray 36.

The pins 44 and horizontal slots 42 prevent the outer tray 34 from being pulled completely away from the intermediate tray 36. The pins 44 and horizontal slots 42 also prevent the outer tray 34 from collapsing inward beyond the intermediate tray 36 to allow the secondary bin 30 to be placed into the intermediate state (as shown in FIG. 2).

The secondary bin 30 may also include a detent feature 46 formed on one of the pin 44 and the horizontal slot 42 and a corresponding notch feature (not shown) may be formed on the other of the pin 44 and the horizontal slot 42. The detent feature 46 and the notch feature cooperate to hold the outer tray 34 and the intermediate tray 36 in their expanded positions.

However, many configurations will include only the detent feature 46 formed on the horizontal slot 42, as shown in FIG. 5. The detent feature 46 will cooperate directly with the pin 44 to hold position of the outer tray 34 and the intermediate tray 36 in their expanded positions. The detent feature 46 may be, for example, a boss extending slightly into the horizontal slot 42, passed which the pin 44 must slide, such that some force is required to move the pin 44 through the detent feature 46. Additional detent features 46 may be formed on the opposite side of the horizontal slot 42 to hold the outer tray 34 and the intermediate tray 36 in their collapsed positions.

As shown in FIGS. 2, 4A, and 4B, the adaptable bin 10 may also include a top plate 50, which is attached to the bin sidewalls 26 above the opening 22. The top plate 50 covers a portion of the collapsed secondary volume. In this configuration, the top plate 50 restricts the opening slightly.

Importantly, the secondary bin 30 does not need to be detached or removed from the adaptable bin 10 in order to maximize the space available in the primary bin. The adaptable bin 10 provides flexibility for storage of different types and sizes of objects within different combinations of the same storage volume 20. Furthermore, the adaptable bin 10 provides this flexibility without the risk of losing the secondary bin 30, which may be the case with removable bins.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:
1. An adaptable bin, comprising:
a bin floor;
at least two bin sidewalls, wherein the bin floor and the bin sidewalls define a storage volume;

a bin opening defined by the bin sidewalls, wherein the bin opening allows access to the storage volume; and a secondary bin, including:
- a first tray fixedly attached to one of the bin sidewalls; and
- a second tray slidably attached to the first tray and slidable between a collapsed position proximal to the first tray and an expanded position distal to the first tray, wherein the collapsed position and the expanded position of the second tray are within the storage volume, such that the secondary bin protrudes into more of the storage volume when the second tray is in the expanded position than in the collapsed position.

2. The adaptable bin of claim 1,
wherein the second tray slides substantially parallel to the bin opening.

3. The adaptable bin of claim 2, further comprising:
a secondary sidewall formed on the second tray, wherein the first tray, the second tray, and the secondary sidewall define a collapsed secondary volume when the second tray is in the collapsed position and define an expanded secondary volume, which is greater than the collapsed secondary volume, when the second tray is in the expanded position.

4. The adaptable bin of claim 3, further comprising:
a third tray slidably attached to the first tray,
wherein the second tray is slidably attached to the third tray and the collapsed position of second tray is proximal to the third tray and the expanded position of the second tray is distal to the third tray, and
wherein the third tray is slidable between a collapsed position proximal to the bin sidewall and an expanded position distal to the bin sidewall.

5. The adaptable bin of claim 4,
wherein the third tray, the second tray, the first tray, and the secondary sidewall define the collapsed secondary volume when the second tray and the third tray are in the collapsed positions, and define the expanded secondary volume when the second tray and the third tray are in the expanded positions.

6. The adaptable bin of claim 5,
wherein the third tray, the second tray, the first tray, and the secondary sidewall define an intermediate secondary volume when one of the second tray and the third tray is in the collapsed position and the other of the second tray and the third tray is in the expanded position, and
wherein the intermediate secondary volume is smaller than the expanded secondary volume and larger than the collapsed secondary volume.

7. The adaptable bin of claim 6, further comprising:
at least one horizontal slot formed in the first tray;
at least one pin formed on the third tray, wherein the pin of the third tray cooperates with the horizontal slot of the first tray to limit movement of the third tray relative to the first tray;
at least one horizontal slot formed in the third tray; and
at least one pin formed on the second tray, wherein the pin of the second tray cooperates with the horizontal slot of the third tray to limit movement of the second tray relative to the third tray.

8. The adaptable bin of claim 7, further comprising:
a top plate attached to the bin walls above the opening, wherein the top plate covers a portion of the collapsed secondary volume.

9. The adaptable bin of claim 8, further comprising:
a detent feature formed on the horizontal slot of the first tray, wherein the detent feature is configured to hold the third tray in the expanded position.

10. An adaptable bin, comprising:
a bin floor;
at least two bin sidewalls, wherein the bin floor and the bin sidewalls define a storage volume;
a bin opening defined by the bin sidewalls, wherein the bin opening allows access to the storage volume; and
a secondary bin, including:
- an inner tray fixedly attached to one of the bin sidewalls;
- an intermediate tray slidably attached to the inner tray and slidable between a collapsed position proximal to the inner tray and an expanded position distal to, but overlapping a portion of, the inner tray; and
- an outer tray slidably attached to the intermediate tray, wherein the outer tray is slidable between a collapsed position proximal to the intermediate tray and an expanded position distal to, but overlapping a portion of, the intermediate tray, wherein the collapsed position and the expanded position of the intermediate tray are within the storage volume, the collapsed position and the expanded position of the outer tray are within the storage volume, and the secondary bin protrudes into more of the storage volume when the outer tray is in the expanded position than in the collapsed position.

11. The adaptable bin of claim 10, further comprising:
wherein the intermediate tray, the outer tray, the inner tray, and the secondary sidewall define an intermediate secondary volume when one of the outer tray and the intermediate tray is in the collapsed position and the other of the outer tray and the intermediate tray is in the expanded position, and
wherein the intermediate secondary volume is smaller than the expanded secondary volume and larger than the collapsed secondary volume.

* * * * *